United States Patent
Sakamoto et al.

(10) Patent No.: US 8,375,105 B2
(45) Date of Patent: Feb. 12, 2013

(54) IN-FLIGHT SERVICE SYSTEM

(75) Inventors: Koji Sakamoto, Osaka (JP); Norikazu Kuwata, Osaka (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 12/893,033

(22) Filed: Sep. 29, 2010

(65) Prior Publication Data

US 2011/0087758 A1    Apr. 14, 2011

(30) Foreign Application Priority Data

Oct. 13, 2009    (JP) ................................ 2009-236376

(51) Int. Cl.
*G06F 15/16* (2006.01)
(52) U.S. Cl. ......... 709/219; 218/223; 218/201; 218/248
(58) Field of Classification Search .................. 709/219, 709/218, 223, 201, 248
See application file for complete search history.

(56) References Cited

U.S. PATENT DOCUMENTS

| | | | |
|---|---|---|---|
| 2005/0066218 A1* | 3/2005 | Stachura et al. | 714/3 |
| 2007/0077998 A1* | 4/2007 | Petrisor | 463/42 |
| 2007/0123287 A1* | 5/2007 | Mock et al. | 455/518 |
| 2008/0303957 A1* | 12/2008 | Soper et al. | 348/725 |
| 2009/0029722 A1* | 1/2009 | Rutten et al. | 455/456.3 |

FOREIGN PATENT DOCUMENTS

JP    09-311843 A    12/1997

* cited by examiner

*Primary Examiner* — Lan-Dai T Truong
(74) *Attorney, Agent, or Firm* — RatnerPrestia

(57) ABSTRACT

When a server unit is stopped by a failure, for example, and gives no response, and a monitor timer times out, an operation panel unit is switched to a proxy server. Then, the operation panel unit transmits request messages to the other operation panel units. The other operation panel units perform necessary operations, such as display and input operations, in accordance with the request messages. When the server unit recovers from the failure, the operation panel unit stops the proxy server function. Again, the server unit transmits request messages to the operation panel unit and the other operation panel units.

9 Claims, 4 Drawing Sheets

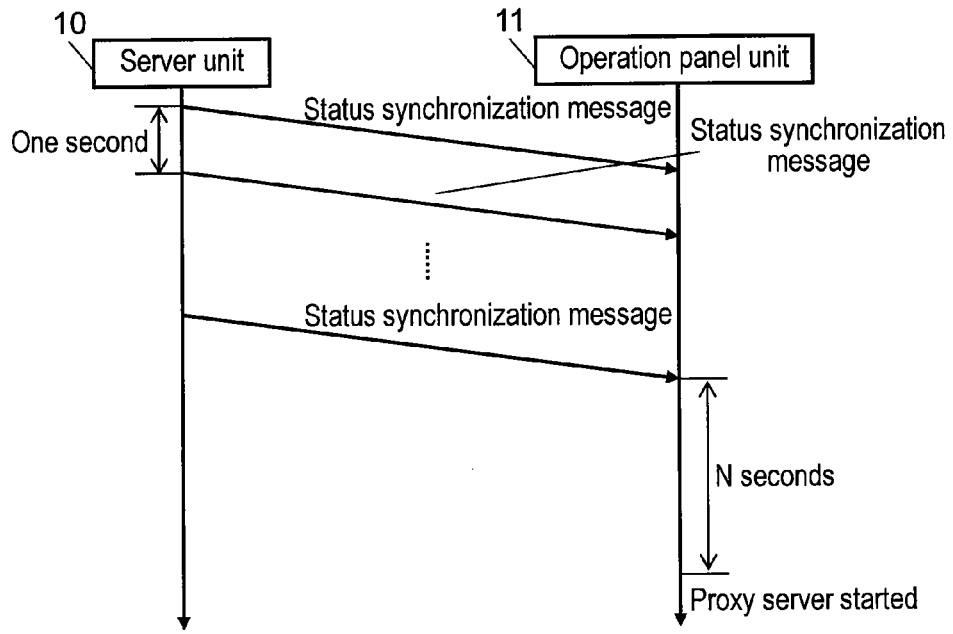
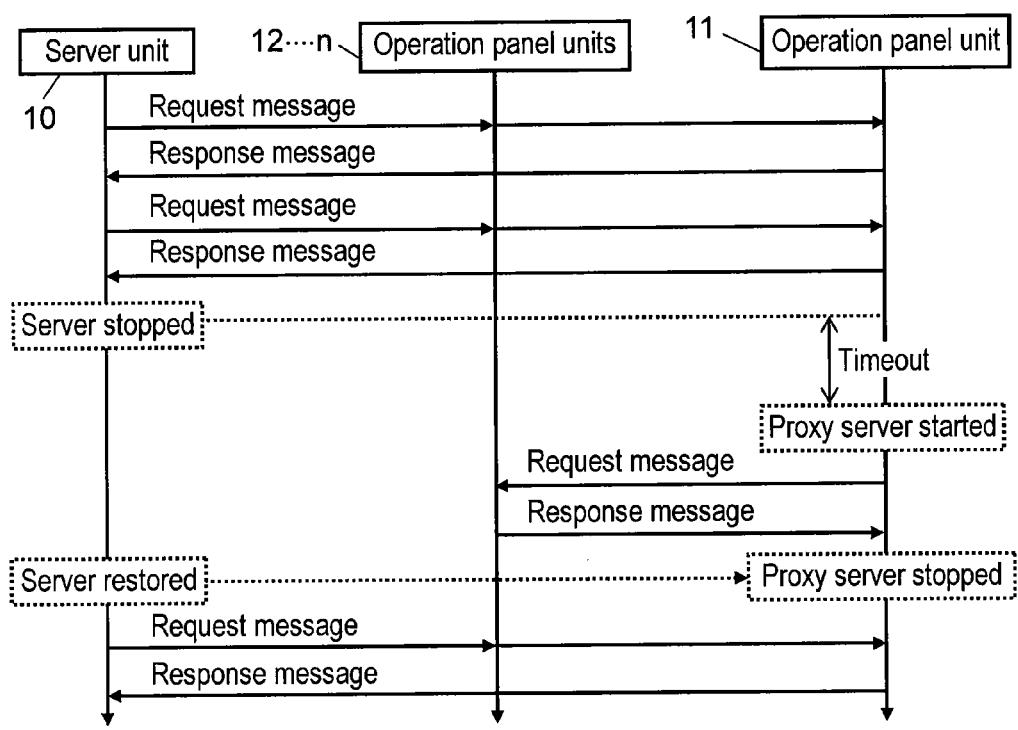

IN-FLIGHT SERVICE SYSTEM

This application claims benefit under 35 U.S.C. §119 to Japanese Application No. JP2009-236376.

BACKGROUND OF THE INVENTION

1. Field of the Invention

The present invention relates to an in-flight service system that performs switchover to a proxy server unit when a failure occurs in the server unit of a server-client system for use in the in-flight service system.

2. Background Art

A conventional in-flight service system for broadcasting, lighting, and air-conditioning in the cabin of an aircraft uses a server-client system. In the server-client system, a cable network interconnects a server unit for controlling the entire system and performing information delivery service, and a plurality of client units, e.g. operation panel units, for receiving the information from the server unit and performing display and input operations, for example, in proximity to flight attendants or passengers.

When a failure occurs in the server unit during server-client communication in such a system, the client units cannot receive service from the server unit.

To address this problem, the server unit is duplexed such that one is a main server unit normally in operation and the other is a standby server unit. Further, the main server unit and the standby server unit exchange information periodically. Using a monitor timer, the standby server unit detects that information exchange with the main server unit is stopped for a certain period when a failure occurs in the main server unit. In response to that detection, the server function is switched from the main server unit to the standby server unit.

At this time, the standby server unit communicates with all the client units interconnected in the network system so as to inform the client units that the server unit has been changed. Further, the server switchover makes the standby server unit a new server unit, which controls the entire system and distributes information in place of the main server unit.

An example of such a server-client type communication system is disclosed in Patent Literature 1.

However, in such a conventional server-client type communication system, the main server unit having a failure can be switched to the standby server unit only after the following operations. The standby server unit makes communication about the server switchover with all the client units in the network system, and all the client units recognize that the server function is switched to the standby server unit.

For this reason, with a large number of client units, the switchover takes time in some cases. Similarly, when the main server unit recovers from the failure, it also takes time to automatically switch back from the standby server unit to the main server unit.

When the server configuration is duplexed as shown in Patent Literature 1 in the conventional method, units having the same performance and the software having the same function need to be installed. Thus, two server units are necessary.

For a network system to be installed in an aircraft, addition of one server unit to the whole system increases the weight and adversely affects the fuel consumption performance.

CITATION LIST

Patent Literature

[Patent Literature 1]
Japanese Patent Unexamined Publication No. H09-311843

SUMMARY OF THE INVENTION

An in-flight service system includes the following elements:
  a server unit for controlling the entire in-flight service system and distributing information;
  a plurality of operation panel units for receiving the information from the server unit and performing display and input operations, for example; and
  a network for interconnecting the server unit and the plurality of operation panel units.
At least one of the plurality of operation panel units has a proxy server function of serving as a proxy of the server unit.

This configuration can provide an in-flight service system capable of addressing the case where a failure occurs in the server unit, without a separate proxy server unit.

BRIEF DESCRIPTION OF DRAWINGS

FIG. 4 is a diagram showing a message sequence when a server function is switched from the server unit to the operation panel unit having the proxy server function in the in-flight service system in accordance with the first exemplary embodiment.

FIG. 5 is a diagram showing an entire message sequence in the in-flight service system in accordance with the first exemplary embodiment.

DETAILED DESCRIPTION OF THE INVENTION

Hereinafter, exemplary embodiments of the present invention are described with reference to the accompanying drawings.

First Exemplary Embodiment

Figure 1:
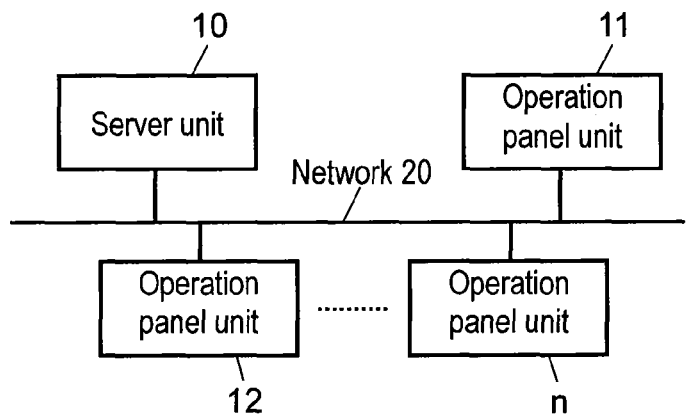
FIG. 1 is a configuration diagram showing an in-flight service system in accordance with a first exemplary embodiment of the present invention.

FIG. 1 is a diagram showing a network configuration of an in-flight service system in accordance with the first exemplary embodiment of the present invention. With reference to FIG. 1, server unit 10, and client units, i.e. operation panel unit 11 and operation panel units 12 through n, are interconnected by network 20.

Server unit 10, operation panel unit 11, and operation panel units 12 through n have the functions described in the conventional art. However, unlike operation panel units 12 through n, operation panel unit 11 not only serves as a client unit but also has a proxy server function of serving as a proxy of server unit 10. A plurality of operation panel units 11 may be disposed in this system.

Figure 2:
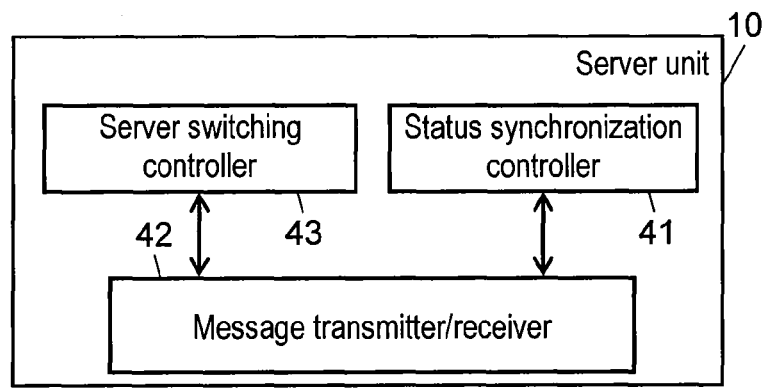
FIG. 2 is a configuration diagram of a server unit in the in-flight service system in accordance with the first exemplary embodiment.
Figure 3:
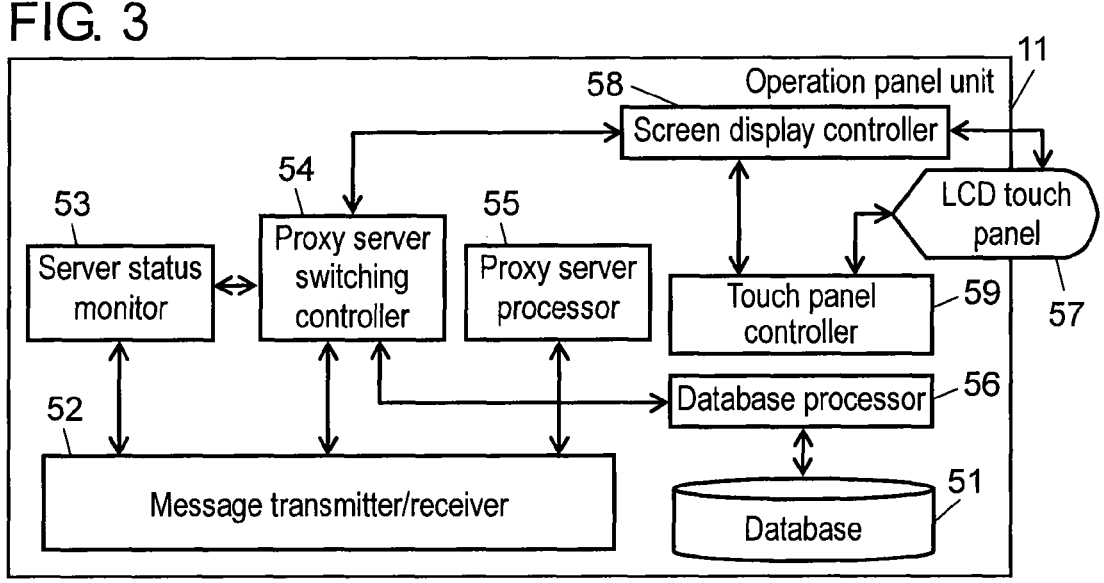
FIG. 3 is a configuration diagram of an operation panel unit having a proxy server function in the in-flight service system in accordance with the first exemplary embodiment.

FIG. 2 is a configuration diagram of server unit 10; FIG. 3 is a configuration diagram of operation panel unit 11 also having a proxy server function.

As described above, a plurality of operation panel units 11 is disposed in the system in some cases. Thus, whether operation panel unit 11 can serve as a proxy of server unit 10 or not is preset in database 51.

In the following description, only the operation panel unit set such that the operation panel unit can serve as a proxy server is denoted as operation panel unit 11, which is discriminated from operation panel units that have proxy server functions but only whose client functions are used.

Hereinafter, with reference to FIG. 2, FIG. 3, and FIG. 4 showing a message sequence between server unit 10 and operation panel unit 11, a description is provided for the operation when the server function is switched from server unit 10 to operation panel unit 11 having a proxy server function.

After the startup of operation panel unit 11 is completed, the operation panel unit is in the state of waiting for a status synchronization message to be received from server unit 10.

In operation panel unit 11, message transmitter/receiver 52 receives a status synchronization message from status synchronization controller 41 via massage transmitter/receiver 42 in server unit 10. Upon receipt of the status synchronization message, server status monitor 53 holds the time at which the message is received from server unit 10, and starts a monitor timer (not shown).

Thereafter, every time the status synchronization message is received from server unit 10 periodically (every second in this exemplary embodiment), the time of receipt is updated and the monitor timer is restarted.

In operation panel unit 11, server status monitor 53 informs proxy server switching controller 54 of a timeout event when the monitor timer expires (after a lapse of n seconds). The timeout time of the monitor timer is also preset in database 51.

Since a status synchronization message from server unit 10 cannot be received for a certain period, proxy server switching controller 54 determines that server unit 10 has a failure and is down, and brings proxy server processor 55 into an operating state.

With reference to FIG. 3, in addition to the above configuration, operation panel unit 11 has database 51 in which whether the operation panel unit can serve as a proxy server or not is preset, and database processor 56 for transmitting the set information to proxy server switching controller 54. As the client function, the operation panel unit also has the following elements:

LCD touch panel 57 combining a liquid crystal display and a touch panel to be touched with a finger or a pen for touch input operation;

screen display controller 58 for displaying image data on LCD touch panel 57; and touch panel controller 59 for controlling touch input operation to LCD touch panel 57.

FIG. 5 is a diagram that shows an entire message sequence including the other operation panel units at the switchover of the proxy server in the in-flight service system in accordance with this exemplary embodiment.

In the in-flight service system of this exemplary embodiment, in order to implement the system operation, server unit 10 transmits request messages to operation panel unit 11 and operation panel units 12 through n, and operation panel unit 11 and operation panel units 12 through n perform necessary operations in accordance with the request messages.

In transmitting a response message to the request from server unit 10, operation panel unit 11 and operation panel units 12 through n store the source IP address of the request message, and return the response message to the source.

Thus, operation panel units 12 through n, i.e. client units, do not need to be aware of whether the source of the request message is server unit 10 or operation panel unit 11 where a proxy server function is in operation.

When server unit 10 is stopped by a failure, for example, gives no response, and the monitor timer times out, operation panel unit 11 is switched to a proxy server. Thereafter, operation panel units 12 through n, i.e. client units, operate under control of operation panel unit 11 serving as a proxy server.

Operation panel unit 11 transmits request messages to operation panel units 12 through n. Operation panel units 12 through n perform necessary operations, such as display and input operations, in accordance with the request messages.

At the time when server unit 10 recovers from the failure, for example, operation panel unit 11 stops the proxy server function. Again, this time, server unit 10 transmits request messages to operation panel unit 11 and operation panel units 12 through n, and operation panel unit 11 and operation panel units 12 through n perform necessary operations in accordance with the request messages.

Figure 6:
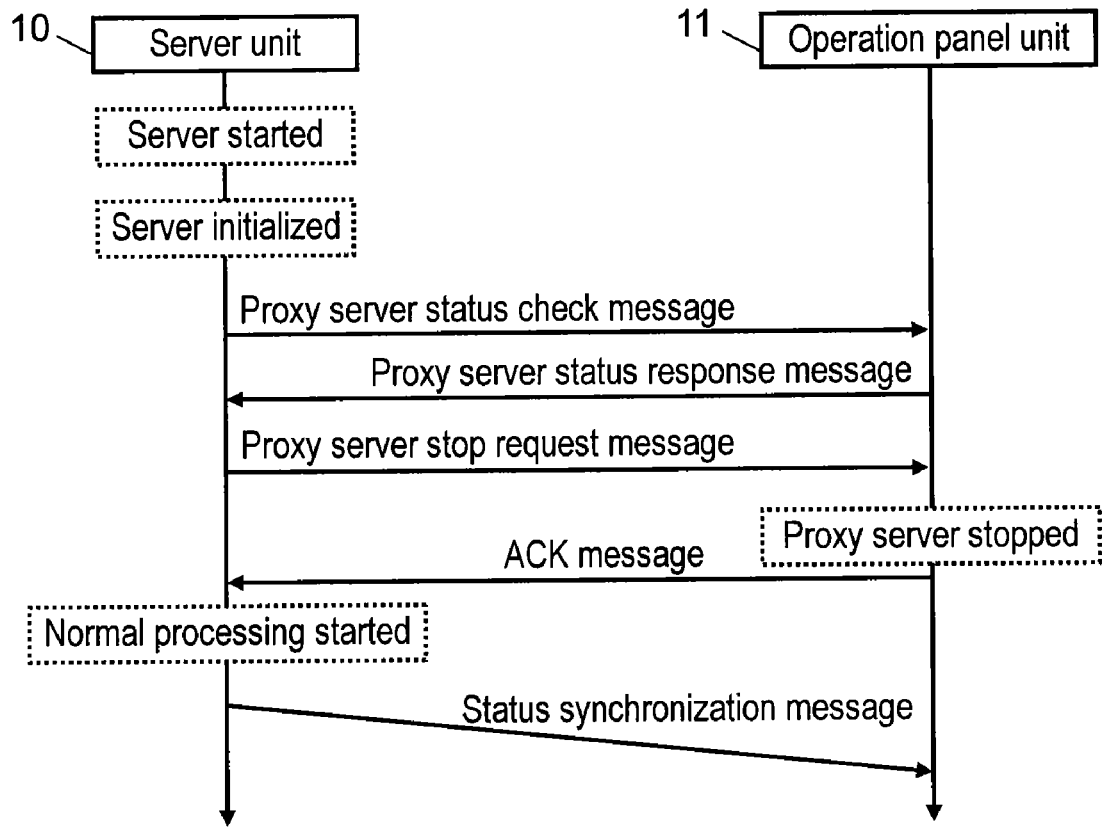
FIG. 6 is a diagram showing a message sequence at restoration of the server unit in the in-flight service system in accordance with the first exemplary embodiment.

Next, a description is provided for the operation of server switchback in this system at the restoration of stopped server unit 10, with reference to the communication sequence for server switchback in FIG. 6.

After the startup of server unit 10 is completed, the server unit is initialized. Next, server switching controller 43 transmits a proxy server status check message, using a multicast IP address showing a group of operation panel units.

With this operation, even when a plurality of operation panel units is interconnected in one system and the proxy server function is enabled in one of these units, server unit 10 does not need to be aware of the one unit.

Always at the time of startup, server unit 10 performs this communication sequence. This is because server unit 10 cannot determine whether the startup of the server unit is performed for the first time after the system has been brought into operation, or after the server function has been switched to the proxy server.

When server status monitor 53 in operation panel unit 11 where the proxy server function is in an operating state receives the proxy server status check message, the server status monitor informs proxy server switching controller 54 of the event of receiving the message. In response, proxy server switching controller 54 returns server unit 10 a proxy server status response message. At this time, the return message is transmitted to server unit 10, using a unicast IP address.

Upon receipt of this proxy server status response message, server switching controller 43 in server unit 10 transmits a proxy server stop request message to the IP address of operation panel unit 11 where the proxy server function is in the operating state.

Upon receipt of the proxy server stop request message, proxy server switching controller 54 in operation panel unit 11 brings proxy server processor 55 into a non-operating state, and returns an acknowledgement message (ACK message) to server unit 10.

Thereafter, in operation panel unit 11, server status monitor 53 restarts the timer for monitoring a status synchronization message from server unit 10.

After having checked the ACK message, server switching controller 43 in server unit 10 starts server processing and starts to transmit a request message to each operation panel unit. Status synchronization controller 41 starts to periodically transmit a status synchronization message to operation panel unit 11.

In this manner, in this exemplary embodiment, one of the operation panel units, i.e. client units, has a proxy server function. This eliminates the need for an additional proxy server unit provided in case that the server unit is disabled by a failure, for example. Therefore, this configuration can prevent an increase in the weight of the aircraft incorporating the system and an adverse effect on the fuel efficiency performance.

Second Exemplary Embodiment

Figure 7:
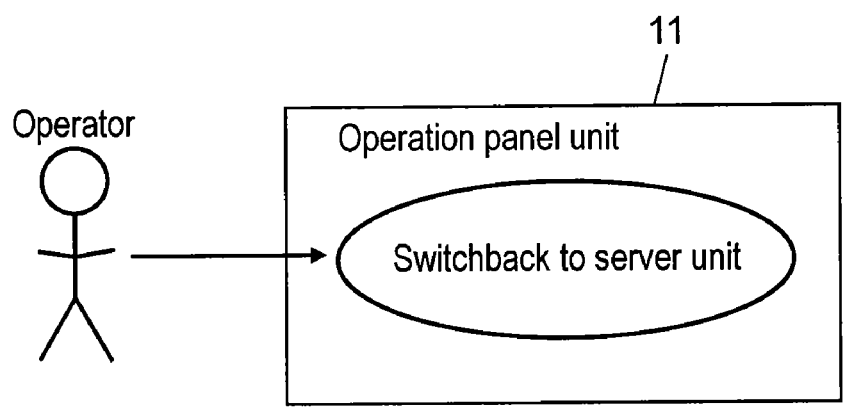
FIG. 7 is a use case diagram when a user of an operation panel performs switchback to a server unit in an in-flight service system in accordance with a second exemplary embodiment of the present invention.

FIG. 7 is a use case diagram of an in-flight service system in accordance with the second exemplary embodiment of the present invention. Here, server unit 10 is already in a stop state, and operation panel unit 11 is in an operating state as a proxy server.

In the first exemplary embodiment, in restoration of server unit 10 thereafter, server unit 10 exchange messages with server status monitor 53 and proxy server switching controller 54 in operation panel unit 11 so that the server unit restores automatically. In contrast, in this exemplary embodiment, first, the operator is informed of the recovery of server unit 10 on the screen of LCD touch panel 57 of operation panel unit 11. Further, the operator can give instructions for switchover to server unit 10 through the input operation to the touch panel, for example.

Figure 8:
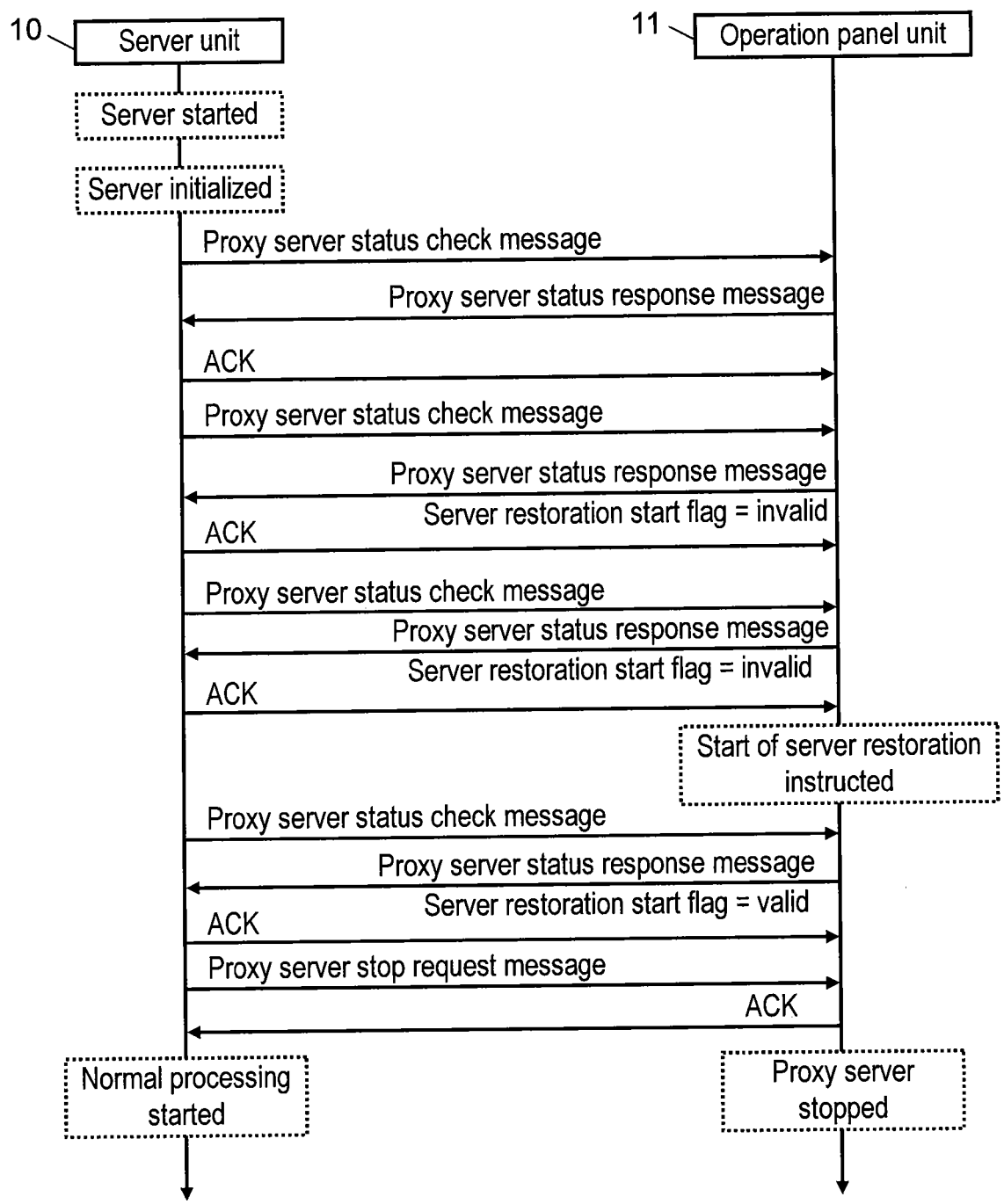
FIG. 8 is a diagram showing a sequence for switchback performed by the user at restoration of the server unit in the in-flight service system in accordance with the second exemplary embodiment.

Operation panel unit 11 having received the instructions for server switchback from the operator performs the communication sequence shown in FIG. 8 with server unit 10.

Upon receipt of a proxy server status check message from server unit 10, operation panel unit 11 returns a proxy server status response message. At this time, operation panel unit 11 determines that server unit 10 can be restored, and displays, on the screen, a message informing the operator that the preparation for server restoration is completed.

Upon receipt of the proxy server status response message, server unit 10 periodically transmits a proxy server status check message to operation panel unit 11 having the proxy server function, using a unicast IP address this time.

Operation panel unit 11 where the proxy server function is enabled returns a proxy server status response message having an invalid server restoration start flag to server unit 10 until an instruction is given by the operator.

When the operator instructs the start of server restoration, following the display on the screen of operation panel unit 11, operation panel unit 11 returns a proxy server status response message having a valid server restoration start flag to server unit 10.

Upon receipt of this message, server unit 10 transmits a proxy server stop request message to operation panel unit 11. Then, after having checked an ACK message from operation panel unit 11, the server unit starts the server function.

Upon receipt of the proxy server stop request message, proxy server switching controller 54 in operation panel unit 11 brings proxy server processor 55 into a non-operating state, and returns an ACK message to server unit 10.

Thereafter, in operation panel unit 11, server status monitor 53 restarts the timer for monitoring a status synchronization message from server unit 10.

After having checked the ACK message, server switching controller 43 in server unit 10 starts server processing and transmits a request message to each operation panel unit. Status synchronization controller 41 starts to periodically transmit a status synchronization message to operation panel unit 11.

In this manner, in this exemplary embodiment, the operator can instruct whether to stop the proxy server function or not in time with the recovery of the server unit. Therefore, switchback to the server unit can be suspended until the stable conditions of the server unit are determined even after the server unit has recovered from the failure.

Further, when the server unit is recovered during the flight of the aircraft, for example, the switchover can be performed after the flight is over. Thus, even an abnormal operation can be addressed.

In the exemplary embodiments, the server unit is separate from the operation panel units. However, a server unit specifically for the server function may be eliminated, and a main server unit and a proxy server unit may be set in the operation panel units.

What is claimed is:

1. An in-flight service system, comprising:
a server having a microprocessor, the server controlling the entire in-flight service system and distributing information;
a plurality of clients having operation panel units receiving information from the server or a proxy server and performing display and input operations without being informed whether the receiving information is being sent by the server or the proxy server; and
a network for interconnecting the server and the plurality of clients,
wherein at least one of the plurality of clients serves as the proxy server, and the controlling the in-flight service system and the distributing information is switched from the server to the proxy server having operation panel units and from the proxy server having operation panel units to the server without informing the plurality of clients that the controlling of the in-flight service system and the distributing information is switched.

2. The in-flight service system of claim 1, wherein the server includes:
a message transmitter or receiver for communicating with the plurality of clients; and
a status synchronization controller for periodically synchronizing a status and transmitting a status synchronization message via the message transmitter or receiver, and
after startup, the server periodically makes the status synchronization message and transmits the status synchronization message to the plurality of clients.

3. The in-flight service system of claim 1, wherein the client having the proxy server function includes:
a message transmitter or receiver configured to communicate with the server;
a server status monitor configured to monitor a status of the server;
a proxy server switching controller configured to switch a server function from the server; and
a proxy server processor configured to implement the proxy server function,
the server status monitor always monitors a status synchronization message from the server, and
when the server status monitor cannot receive the status synchronization message for a predetermined period, the proxy server processor is operated.

4. The in-flight service system of claim 1, wherein the client having the proxy server function includes:
   a database in which whether the client operates as a proxy server or not is preset; and
   a database processor configured to write data into and reading data from the database.

5. The in-flight service system of claim 4, wherein the database processor sets a status monitor time of the server in the database, and in accordance with the monitor time, the proxy server switching controller performs switchover to the proxy server function.

6. The in-flight service system of claim 1, wherein the server includes a server switching controller, the server switching controller transmitting a proxy server status check message to the plurality of clients after startup of the server, when a response to the proxy server status check message is valid, the server switching controller enabling a server function upon receipt of a proxy server end notification message from the client having the proxy server function, and
   when the client having the proxy server function receives the proxy server status check message from the server with the proxy server function enabled, the client transmits the proxy server end notification message to the server, and the proxy server switching controller stops the proxy server function.

7. The in-flight service system of claim 1, wherein
   the server includes a server switching controller, the server switching controller transmitting a proxy server status check message to the plurality of clients after startup of the server, when a response to the proxy server status check message is valid, the server switching controller transmitting a proxy server stop request message to the plurality of clients, the server switching controller enabling a server function upon receipt of an acknowledgement of the proxy server status check message,
   when the client having the proxy server function receives the proxy server status check message from the server with the proxy server function enabled, the client returns a message showing that the proxy server function is enabled, and
   upon receipt of the proxy server stop request message from the server, the proxy server switching controller stops the proxy server function and thereafter transmits an acknowledgement message to the server.

8. The in-flight service system of claim 6 wherein the proxy server switching controller stops the proxy server function through an operation of an operator in the client.

9. The in-flight service system of claim 7 wherein the proxy server switching controller stops the proxy server function through an operation of an operator in the client.

\* \* \* \* \*